(12) United States Patent
Gurreri et al.

(10) Patent No.: US 7,338,214 B1
(45) Date of Patent: Mar. 4, 2008

(54) METHOD AND APPARATUS FOR SEALING FIBER OPTIC CONNECTORS FOR INDUSTRIAL APPLICATIONS

(75) Inventors: Michael Lawrence Gurreri, York, PA (US); David Donald Erdman, Hummelstown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/467,244

(22) Filed: Aug. 25, 2006

(51) Int. Cl.
*G02B 6/36* (2006.01)

(52) U.S. Cl. ............................. 385/55; 385/53; 385/56

(58) Field of Classification Search ...................... None
See application file for complete search history.

(56) References Cited

U.S. PATENT DOCUMENTS

| | | | | |
|---|---|---|---|---|
| 6,227,717 | B1 | 5/2001 | Ott et al. ........................ | 385/53 |
| 2005/0185897 | A1* | 8/2005 | Duncan ......................... | 385/92 |
| 2006/0089049 | A1* | 4/2006 | Sedor ........................... | 439/620 |
| 2006/0159399 | A1* | 7/2006 | Erdman et al. ................ | 385/53 |
| 2007/0036489 | A1* | 2/2007 | Grzegorzewska et al. .... | 385/88 |
| 2007/0047877 | A1* | 3/2007 | Pepe ............................. | 385/86 |
| 2007/0105432 | A1* | 5/2007 | Muhs et al. ................... | 439/492 |

OTHER PUBLICATIONS

Molex Catalog "Optical Industrial Cable Assemblies and Adapters" Dated 2005, 2 pages.
Molex Incorporated "Connector LC Industrial Assembly Outdoor Cable" Drawing dated 2005.
http://www.molex.com Web page 2005.
http://www.molex.com Optical Industrial LC Duplex Cable Assemblies Web page 2005.
http://siemon.com Industrial MAX 6 Connectivity Web page 2005; 3 pages.
Industrial MAX 6 Connectivity Brochure; 4 pages dated 2005.

* cited by examiner

*Primary Examiner*—Rodney Bovernick
*Assistant Examiner*—Mike Stahl (57) ABSTRACT

The invention is a protective enclosure that can be adapted for use with different types of connectors, including LC type fiber optic connectors. The protective enclosure includes a plug portion and an adapter portion. The plug portion includes a plug housing having an internal longitudinal bore adapted to accept a plug connector of a connector type larger than an LC adapter, but includes a clip to which one or two LC plug connectors can be fixedly mounted that can optionally fixedly clip into the internal bore of the housing so that an LC connector can be fixedly mounted within the housing. The adapter portion includes an adapter housing having an internal longitudinal bore adapted to accept an adapter connector of a connector type larger than an LC adapter, but including an optional sleeve that can fixedly snap into the internal bore of the adapter housing and within which an LC adapter connector can be fixedly mounted.

17 Claims, 11 Drawing Sheets

METHOD AND APPARATUS FOR SEALING FIBER OPTIC CONNECTORS FOR INDUSTRIAL APPLICATIONS

FIELD OF THE INVENTION

The invention pertains to fiber optic connectors. More particularly, the invention pertains to a method and apparatus for sealing fiber optic connectors to protect them from dust, moisture, and other contaminants.

BACKGROUND OF THE INVENTION

Optical fibers are becoming increasingly more prevalent as a medium for transmitting high bandwidth voice and data signals in telecommunications systems. There are a number of different standardized connectors in the fiber optic cable industry used for interconnecting two fiber optic cables to each other or for interconnecting a fiber optic cable to a piece of equipment. Some of the more common standardized connectors are the LC, ST, SC, and FC type connectors. Each of these types of connectors must meet certain dimensional standards. Also, typically, any type of connector system typically comprises two complementary connectors, e.g., a plug (the male connector) and an adapter (the female connector).

Unlike copper and other conductive media for transmitting electrical signals, fiber optic cable connectors must be designed so as to be extremely precise in terms of both aligning the optical fibers that terminate in the each of the mating connectors with each other and assuring that the ends of the fibers are clean and have as low reflectivity as reasonably possible in order to assure that the signals are effectively transferred from one fiber to the next with minimal loss of signal strength and signal quality. The connectors are made to precise tolerances and the process of terminating an optical fiber to an optical fiber connector, which process often is performed in the field, is laborious and painstaking.

Such fiber optic connectors may be disposed in environments that are harsh and in which dust, dirt, moisture, and/or other contaminants are prone to enter the connection. Generally, the aforementioned standardized connectors have fairly tight tolerances and do not permit the ingress of dirt or moisture under mild conditions, such as in homes and office buildings. However, in factories, motor vehicles, and outdoor settings, such as cellular antenna towers, in which moisture or dust may be significant, standard fiber optic connectors may not be adequate to prevent the ingress of dust or moisture into the connectors. When fiber optic connectors are expected to be located in such harsh environments, it is desirable to place a sealed housing around the connectors. Accordingly, protective enclosures are commonly used to prevent optical fiber connectors from contamination by dust, dirt, moisture, and other contaminants. Such protective enclosures also provide additional protection from mechanical damage as a result of the ruggedized housing and strain relief of the protective enclosure.

For instance, U.S. Pat. No. 6,227,717 discloses one exemplary protective enclosure for use with ST or SC type connectors.

Generally, a protective enclosure comprises two complementary mating halves just like the connectors themselves, namely, a plug half and an adapter half. Each of the halves typically mounts over the corresponding half of the connector and comprises some structure and mechanism for sealing the two connectors inside the structure with a relatively dirt and watertight seal. The Siemon Company of Watertown, Conn., USA manufacturers an industrial protective enclosure for a duplex LC type fiber optic connector. The plug half of the protective enclosure comprises an LC connector holder that includes two saddles within each of which an LC connector is slid sideways (i.e., transverse to the axial direction of the optical fibers). As the plugs are slid sideways into the holder, the installer must hold down the rear latches of the LC connectors so that they can slide under a bar on the holder that contacts and defeats the rear latches of the LC connectors, permanently holding them in an inwardly flexed position. Then, while manually holding the duplex LC connectors and LC connector holder together so that they do not fall apart, the installer slides this assembly axially into the plug protective housing while manually aligning the LC connector holder for proper placement in the housing.

With respect to the adapter half of the protective enclosure, the LC adapter is slid axially into the adapter half of the protective enclosure. The adapter half of the Siemon protective enclosure includes grooves for matingly engaging the latches that are on the side surfaces of LC adapters to lock the LC adapter within the adapter housing portion of the protective enclosure.

The two housing halves of the protective enclosure mate with each other via a conventional bayonet type mating, thereby sealing the LC adapter and plug within the protective enclosure.

SUMMARY OF THE INVENTION

The invention is a protective enclosure that can be adapted for use with different types of connectors, including LC type fiber optic connectors. The protective enclosure includes a plug portion and an adapter portion. The plug portion includes a plug housing having an internal longitudinal bore adapted to accept a plug connector of a connector type larger than an LC adapter, but includes a clip to which one or two LC plug connectors can be fixedly mounted that can optionally fixedly clip into the internal bore of the housing so that an LC connector can be fixedly mounted within the housing. The adapter portion includes an adapter housing having an internal longitudinal bore adapted to accept an adapter connector of a connector type larger than an LC adapter, but including an optional sleeve that can fixedly snap into the internal bore of the adapter housing and within which an LC adapter connector can be fixedly mounted.

DETAILED DESCRIPTION OF THE INVENTION

In order to reduce the number of components that must be design and manufactured to provide dust and moisture protection for the various types of connectors commonly used in telecommunications and other fields, it would be desirable to provide a protective enclosure that can be adapted for use with multiple types of connectors with minimal componentry needed to adapt between usage for the two or more different connector types. The present invention provides a protective enclosure that can be used, with minimal changes, to protect both RJ-45 type conductive connectors and LC type fiber optic type connectors and that also can be used in connection with both simplex and duplex LC connector.

Figure 1:
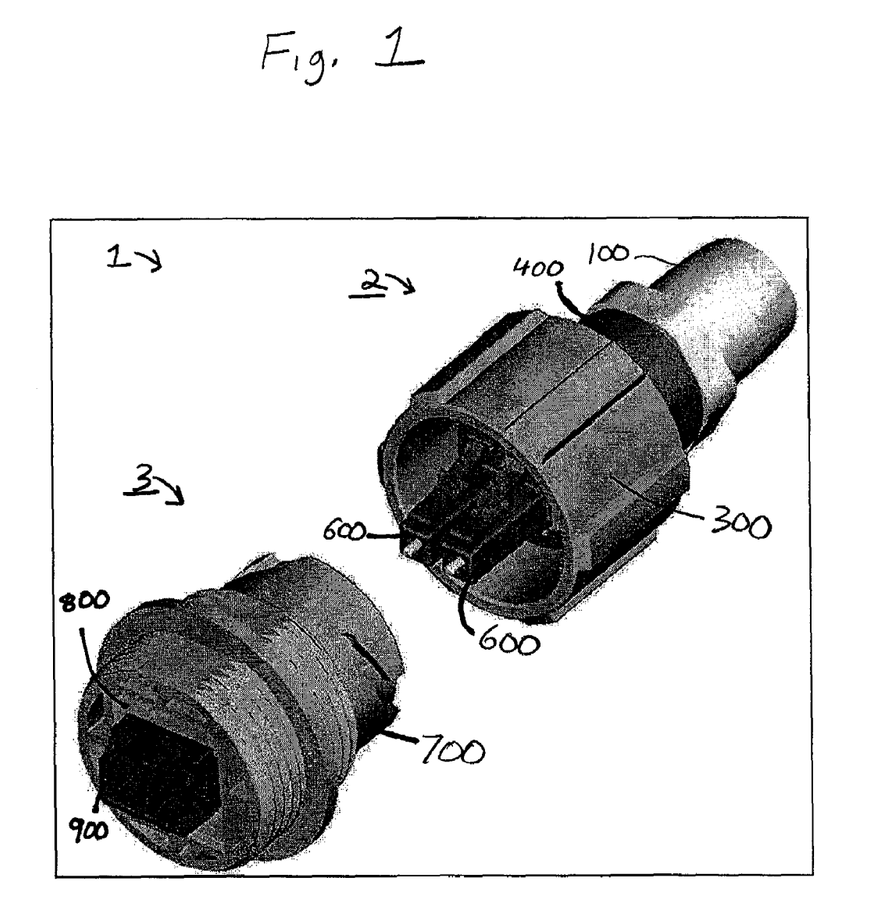
FIG. 1 is a perspective view of the two halves of an LC protective enclosure comprising a plug portion and mating adapter portion in accordance of the principles of the present invention.

Referring to FIG. 1, it shows the two halves 2 and 3 of an LC style protective enclosure 1 constructed in accordance with the principles of the present invention.

The figures in this application illustrate a duplex embodiment of the invention. However, it will be readily apparent to those of skill in the art that the invention also can be applied to a simplex connector by eliminating one of the sets of connectors.

The plug portion 2 of the protective enclosure 1 includes two LC plug connectors 600 disposed within a universal holder 400. The holder 400 is surrounded by a shell 300 which will mate in bayonet style with the housing 700 of the adapter half 3 of the protective enclosure 1. The universal holder 400 is adapted to accommodate either an RJ-45 connector or one or two LC connectors, as described in greater detail herein below. An interfacial seal 200 (obstructed in the view of FIG. 1, but which can be seen in FIG. 2) is inserted over the forward end of the universal holder 400. It is essentially a flexible flat washer that will provide a good moisture-proof seal when squeezed between the two halves 2 and 3 when they are joined. Note that the term "forward" refers to the direction toward the interface of the two mating connector halves and the term "rearward" refers to the direction away from the interface of the two mating connector halves. Thus, when the two connector halves are joined, the forward direction for the plug half of the connector is the opposite direction of the forward direction for the adapter half of the connector.

The adapter portion 3 comprises an LC duplex adapter 900 disposed in a housing 700 compliant with the ODVA specification, where ODVA refers to the Open DeviceNet's Vendors Association. An adapter sleeve 800 is disposed between the duplex LC adapter 900 and the housing 700. The adapter sleeve 800 permits the LC adapter to fit snugly within the bore of the housing 700, the dimensions of which are adapted to accept the larger RJ-45 adapter when being used in connection with that type of connector.

Figure 2:
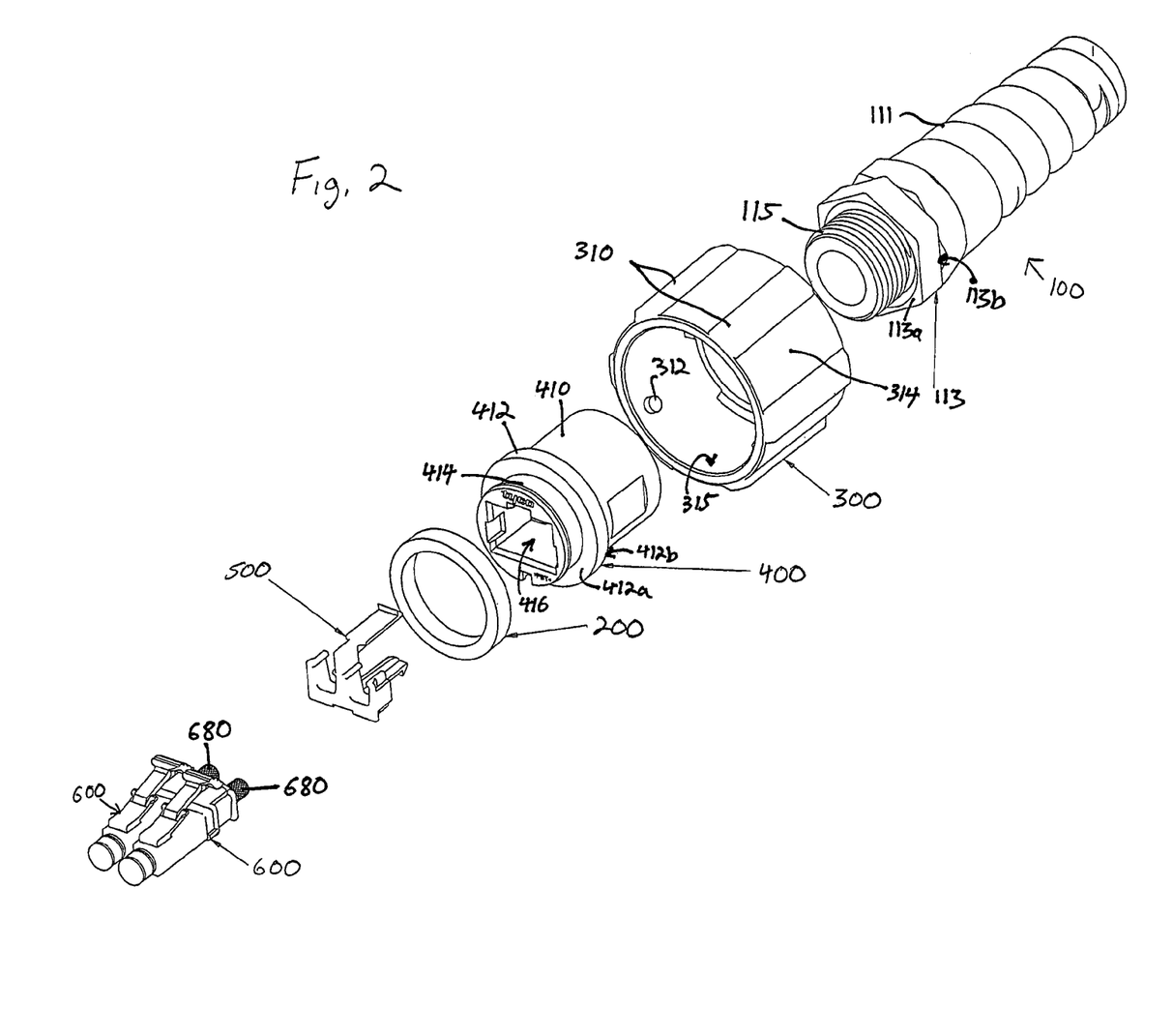
FIG. 2 is an axially exploded perspective view of the components of the plug half of the protective enclosure of FIG. 1 in accordance of the principles of the present invention.

FIG. 2 is an exploded view of the plug assembly 2 of FIG. 1. Two optical fiber cables will be terminated in the two LC connectors 600. However, in order not to obfuscate the illustration of the components of the plug assembly 2, the optical fiber cables are not shown in FIG. 2. Rather, only eyelets 680 are shown extending from the rear of the two LC plug connectors 600. However, it should be understood that optical fiber cables will be terminated to the plug connectors 600 in a conventional fashion and the cable jackets and strength members will protrude from the rear of the plug connector 2 and the cable will extend through all of the other components and out of the back of the compression fitting 100.

The duplex clip 500 is the component that permits the LC plug connectors 600 to be firmly attached within the universal holder 400, the internal bore is dimensioned to also accept the larger RJ-45 type plug connector. With specific reference to FIG. 5, which shows a more detailed view of the duplex clip 500, and FIG. 6, which shows a more detailed view of the LC plug connector 600, the duplex clip 500 is made of a resilient material, preferably plastic, and includes two saddles 515 defined by the spaces between the middle longitudinal wall 518 and each of the two outer walls 514 of the click. Each connector 600 snaps into one of the saddles 515 of the duplex clip 500. Flanges 516 extend inwardly from the tops of the outer walls 514. Each of the two saddles essentially is defined by the space enclosed by the middle wall 518, bottom wall 520, outer wall 514, and inwardly extending flange 516 corresponding to each saddled 515.

Figure 6:
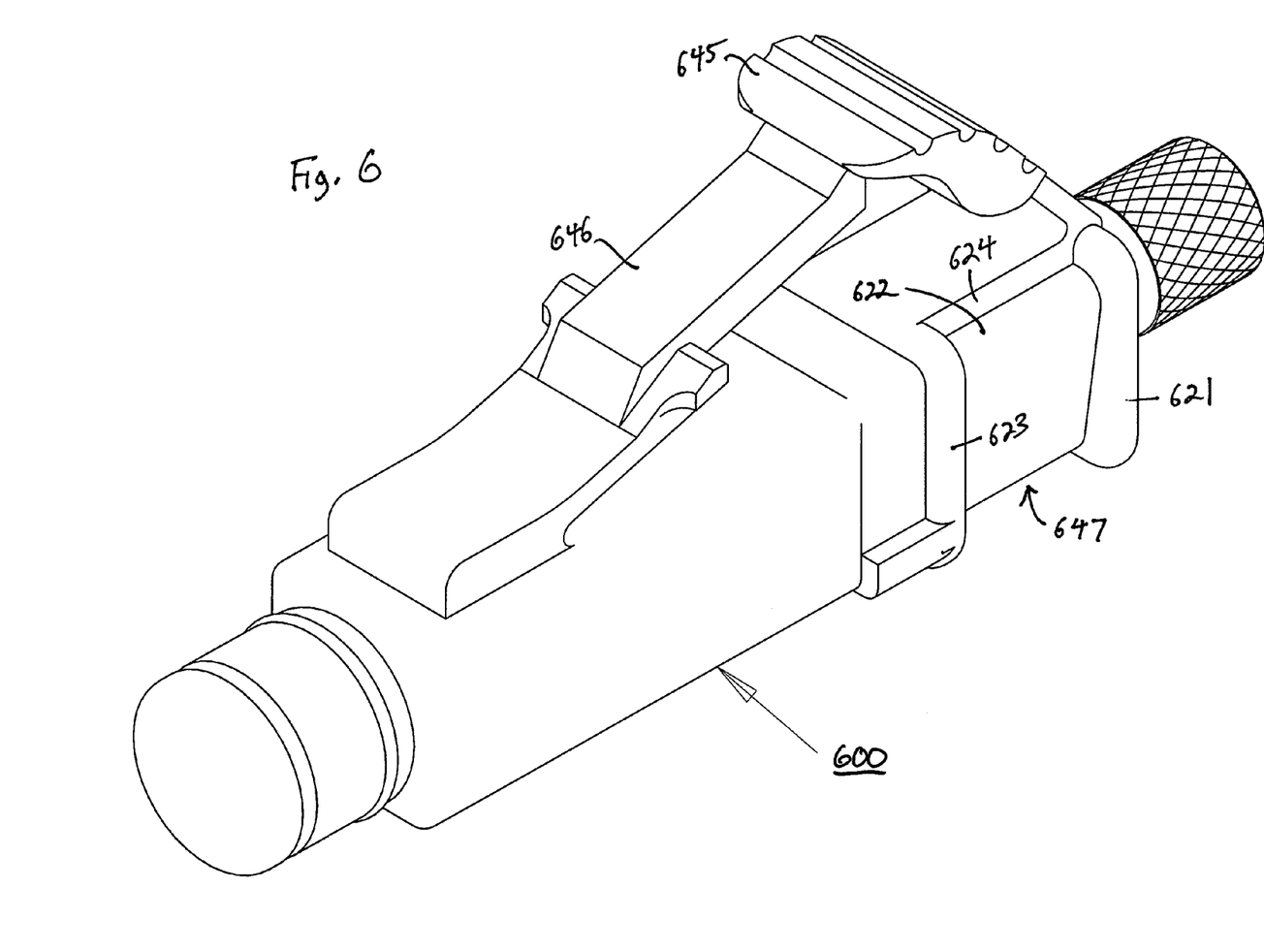
FIG. 6 is a more detailed perspective view of the LC connector of FIG. 2.
Figure 7:
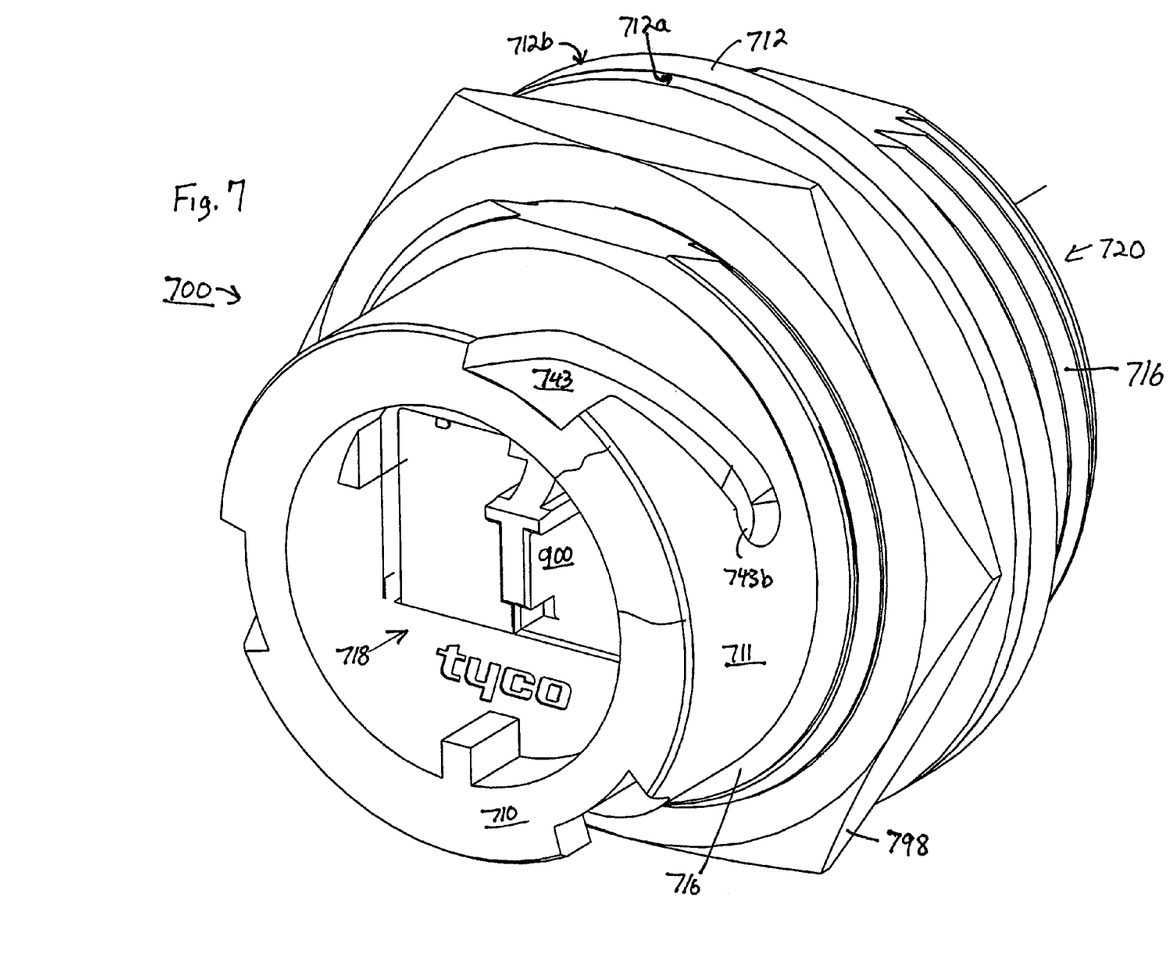
FIG. 7 is a cross-sectional view of the housing of FIG. 3.

Referring now to FIG. 6, each connector 600 has a recess (or groove) 647 near its rearward end. The groove is essentially defined by ribs 621, 623, and 624 in the sides and top of the connector 600. The connector also includes a rear latch arm 645 and a forward latch arm 646 that overlap each other near their ends. The overlapping ends of the latch arms 645, 646 not connected to each other. The latch arms 645, 646 are flexible such that both latches can be flexed toward the plug body. These latches 645, 646 are conventional and are commonly used to engage complementary slots found in conventional LC adapters.

Figure 10A:
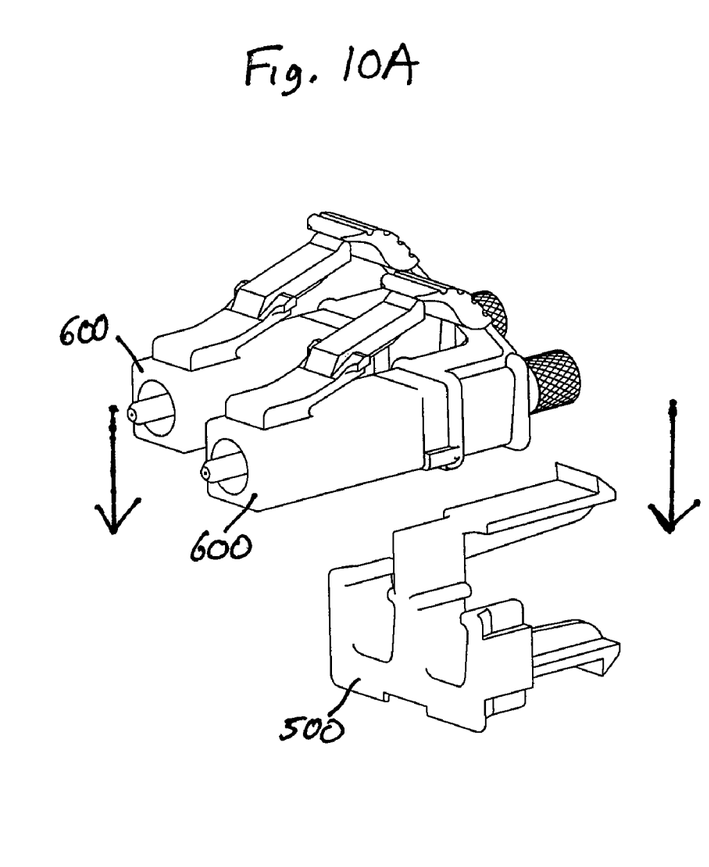
FIG. 10A is a perspective view showing the manner of insertion of the LC plug connector into the duplex clip of FIG. 2.
Figure 10B:
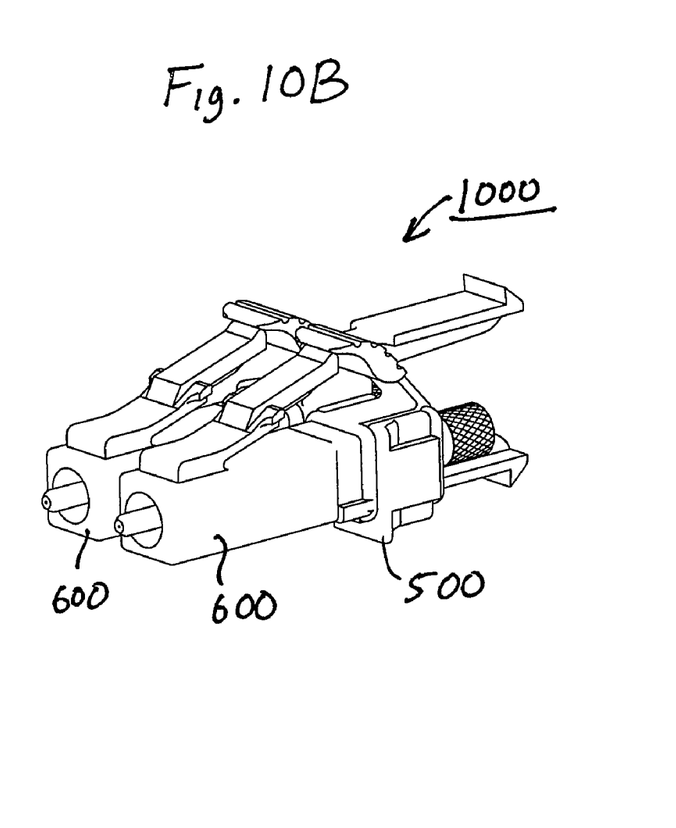
FIG. 10B is a perspective view showing to LC connectors fixed within the duplex clip.

To assemble the LC connectors to the duplex clip 500, each LC connector 600 is inserted from the top downwardly into its respective saddle 515 in the duplex clip 500 with the recess 619 on the connector 600 aligned with the saddled 515 of the clip 500, as shown in FIG. 10A. As the connector 600 is being inserted, the outer walls 514 of the clip 500 resiliently flex outwardly to permit the connector 600 to be inserted into the saddle 515. When the inwardly extending flanges of 516 clear the upper surface 622 of the groove 647 in the connector 600, the walls 514 snap back inwardly, thereby trapping the LC connector 600 in the saddle as shown in FIG. 10B. The ribs 621, 623 butt up against the forward and rear edges 514 *a*, 514*b* of the outer walls 514, thereby fixing the connector 600 in the duplex clip 500 in the axial direction. The floor 520 and the inwardly extending flange 516 butt up against the bottom and top surfaces 647, 622, respectively, of the connector recess 619 to trap the connector 600 in the saddle 515 in the vertical direction. (Note that all directions refer to the specific orientations shown in the drawings, which are merely exemplary). The middle and outer walls 531, 514, of course, trap the connector in the horizontal direction. Accordingly, the connectors 600 will be fixedly attached to the clip 500.

The clip is dimensioned such that the centerline spacing of two LC connectors disposed in the two saddles is equal to that of a standard LC connector pair, which is nominally 6.25 mm. This allows the two LC plug connectors 600 in the plug half 2 to mate appropriately with a duplex LC adapter connector 900 on the adapter half 3 of the connection.

Referring again to FIG. 5, two cantilevered arms 510 extend rearwardly in the longitudinal direction from the top and bottom, respectively, of the middle wall 518. Each of the cantilever arms 510 has a latch 510a extending outwardly from its distal end 510d. Each latch has a beveled rear edge 510b and a straight (vertical) forward edge 510c. The arms have a central axial rib 512 in order to increase their strength, and particularly their flex strength. The proximal end 510e of the upper cantilever arm has a reduced width (via radiused transition 510f) so as to provide clearance for the insertion of the LC plug connectors 600 as described above in connection with FIGS. 10A and 10B.

When the LC connectors 600 and clip 500 are assembled to form the connector/duplex clip assembly 1000 shown in FIG. 10B, that assembly can be inserted axially rearwardly into the bore 416 of the holder 400 as described more fully below.

Figure 4A:
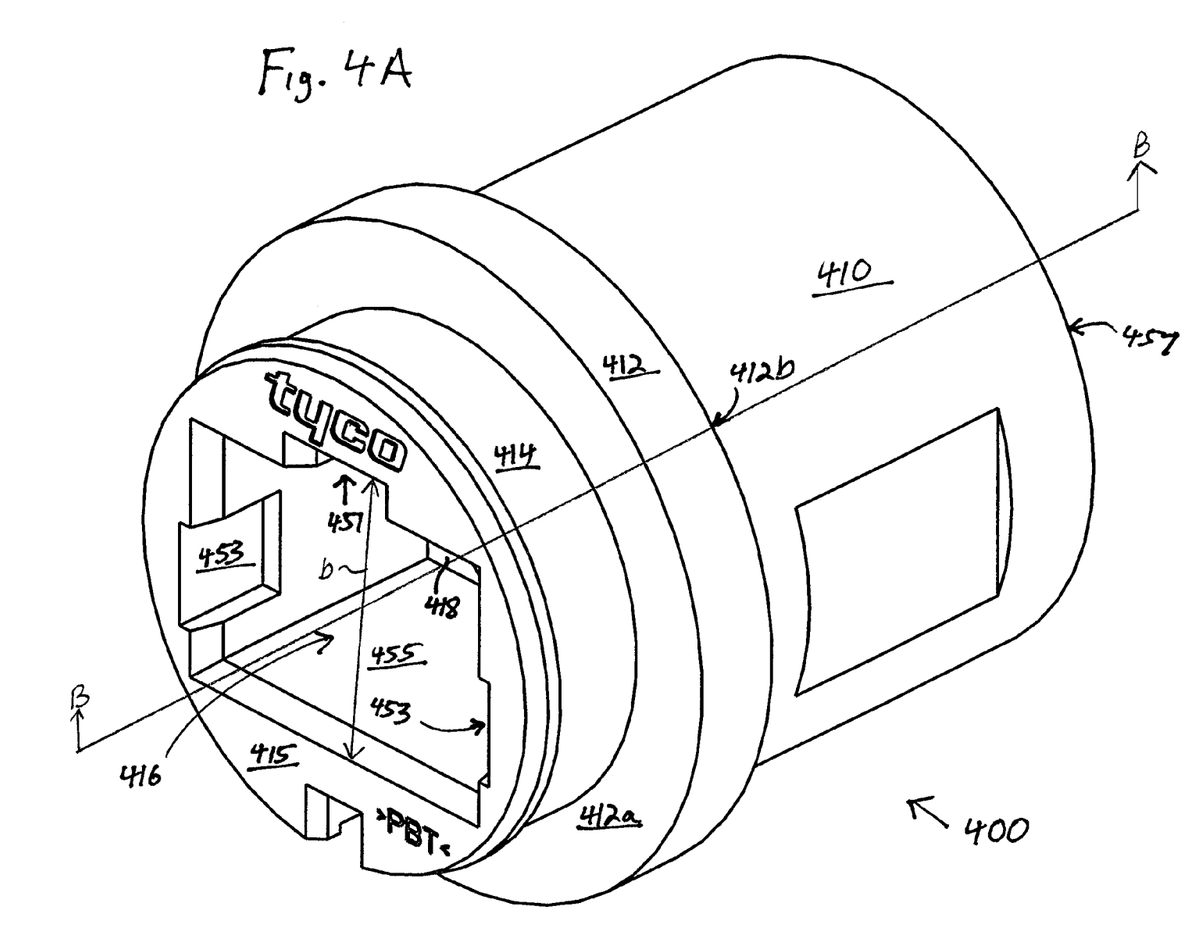
FIG. 4A is a more detailed perspective view of the universal holder of FIG. 2.
Figure 4B:
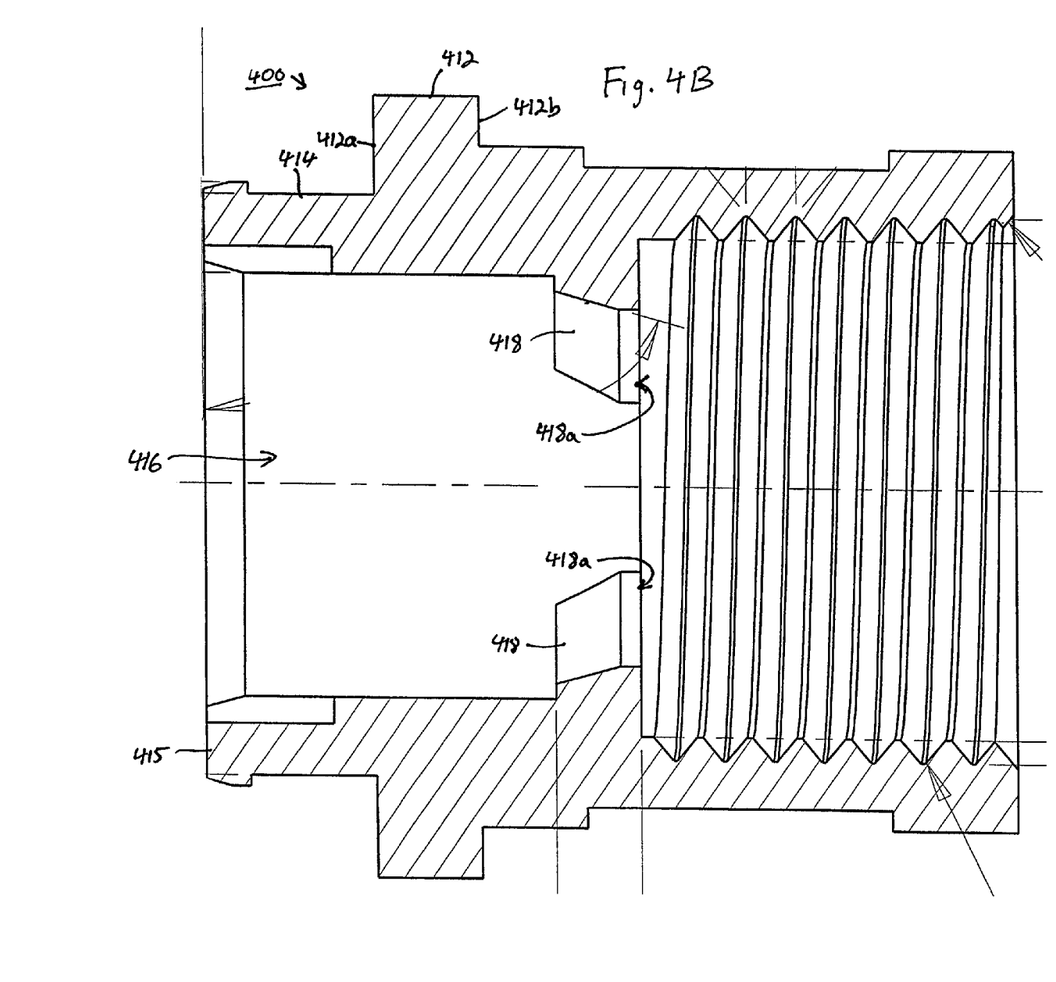
FIG. 4B is a cross-sectional view of the universal holder of FIG. 2 taken along line B-B in FIG. 4A.

Turning now to FIGS. 4A and 4B, which are detailed perspective and cross sectional views of the universal holder 400, the universal holder 400 is generally cylindrical comprising a front portion 414 and a rear portion 410. It also comprises an intermediate flange 412 of larger outer diameter than the diameters of the front and rear portions 414, 416. Furthermore, the internal bore 416 is intersected by an intermediate wall 418 with a circular opening 419. The portion of the internal bore 416 that is forward of the intermediate wall 418 is generally rectangular and dimensioned to accept a standard RJ-45 connector. The portion of the internal bore that is a rearward of the intermediate wall 418 is generally circular. The rear portion of the internal bore may be internally threaded so as to permit it to be screwed together with the compression fitting 100, as described more fully below.

The front portion of the internal bore 416 includes two blind channels 453, one on each of the side walls of the bore. Channels 453 are in communication with the front surface 423 of the universal holder and have a back edge 453a. The front portion of the internal bore 416 further includes another channel 451 in the top wall of the bore. Channel 451 is adapted to accept the top latch found on a standard RJ-45 connector. Unlike channels 453, this channel runs the full length from the front surface 415 to the intermediate internal wall 418.

Figure 5:
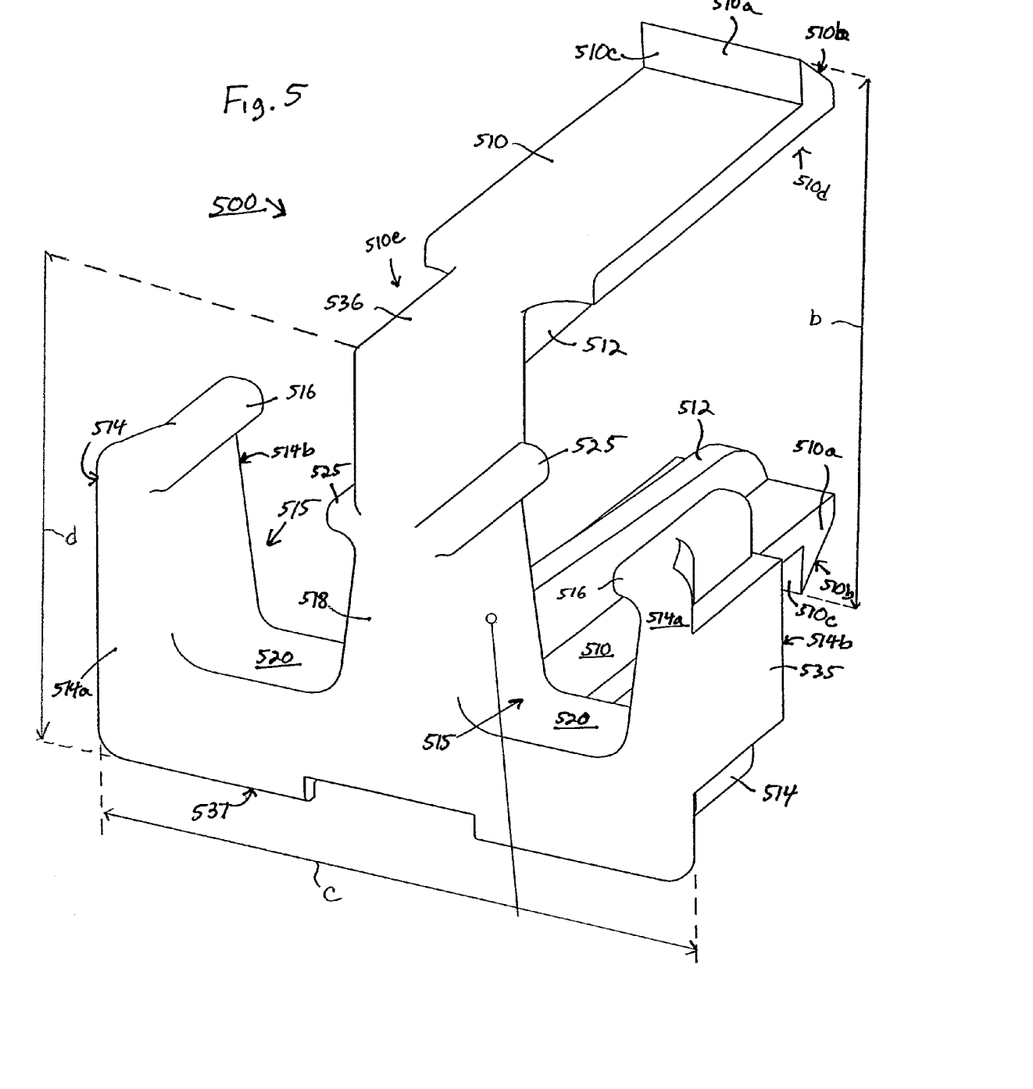
FIG. 5 is a more detailed perspective view of the duplex clip of FIG. 2.

Now with reference to both FIGS. 4 and 5, when the connector/duplex clip assembly 1000 is inserted into the universal holder, the latch 510a at the end of the upper cantilever arm 510 slides within channel 451 in the top wall of the front end of the bore 416. Likewise, the latch 510a at the end of the lower cantilever arm 510 engages and slides along the floor 455 of the bore 416. The arms 510 and latches 510a are sized and positioned so that the spacing, a, between the latches 510a on the upper and lower arms 510 is slightly greater than the distance, b (FIG. 4A), between the top of channel 451 and the floor 455 of the bore 416. Thus, when the assembly 1000 is slid into the bore 416 of the universal holder 400, the beveled edges 510b of the latches meet the surface of the bore 416 and cause the cantilever arms 510 to flex inwardly as the latches 510a slide along the channel 451 and floor 455. When the latches 510a clear the intermediate wall 418, the resilient cantilever arms 510 will snap back outwardly so that the vertical faces 510c of the latches 510a will catch on and butt up against the forward side of the intermediate wall 418 of the universal holder 400, preventing the assembly 1000 from sliding back out in the forward direction (unless the cantilever arms 510 are intentionally flexed inwardly again).

Longitudinally directed ribs 535 on the outer surfaces of the outer walls 514 of the duplex clip 500 are positioned so that they engage the blind channels 453 on the inner side walls of the universal holder 400. These channels 453 are of a width in the vertical direction transverse to the longitudinal dimension that is essentially equal to the height of the blind channels 453 in the plug housing so as to fit snugly therein in that transverse direction. The channels 453 have a length so that the rear walls 453a of the channels 453 will butt up against the rear edges 535a of the ribs 535 of the duplex clip 500 essentially at the same instant that the latches 510a at the ends of the cantilever arms 510 clear the intermediate wall 418. In other words, the rear edges of the ribs 535 are spaced from the latches 510a at the distal ends of the arms 510 in the longitudinal dimension a distance approximately equal to the distance between the shoulder of the intermediate wall 418 in the plug housing and the rear walls 453a of the blind channels 453. Accordingly, the combination of (1) the butting of the rear walls 453a of channels 453 against the rear edges 535a of ribs 535 and (2) the butting of the latches 510a against the intermediate wall 429 will prevent movement of the duplex clip/LC connector assembly (FIG. 10B) in the axial direction.

The installer should bias or hold down the rear anti-snag latch 645 of each LC connector as he or she is inserting the assembly 1000 into the plug housing 400. Once the assembly 100 is inserted within the housing 400, the rear anti-snag latches 645 will be biased by the internal bore of the holder, particularly, by sizing the combined envelope height of the connector and clip assembly 1000 to be larger than the internal bore of the holder. The biasing of the rear latch 645 effectively defeats each front retention latch 646 also. Thus, when the LC connector is disposed within the plug housing, it will not serve a latching function with respect to the adapter connector 900, but will continue to serve as a polarization feature that prevents incorrect engagement of the plug and adapter connectors.

The outer dimensions of the duplex clip 500 (i.e., (1) the spacing between the outer walls 514, c, in the horizontal dimension and (2) the spacing between the top surface 536 (and upper cantilever arm 510) and bottom surface 537 (and lower cantilever arm 510), d, are dimensioned to be slightly smaller than the rectangular dimensions of the front end of the bore 416 in the universal holder 400 so that the duplex clip/connector assembly 1000 fits relatively tightly in the bore 416 of the universal holder 400. In other words, the clip 500 has the same outer dimensions as an RJ-45 plug connector. Of course, as previously noted, the latches 510a at the ends of the cantilever arms actually extend beyond the dimensions of the bore 416 so that they will cause the cantilever arms 510 to deflect inwardly as the clip 50 is inserted into the bore 416 and so that the latches 510a will butt up against the intermediate wall 429 when fully inserted, all as described above.

Figure 3:
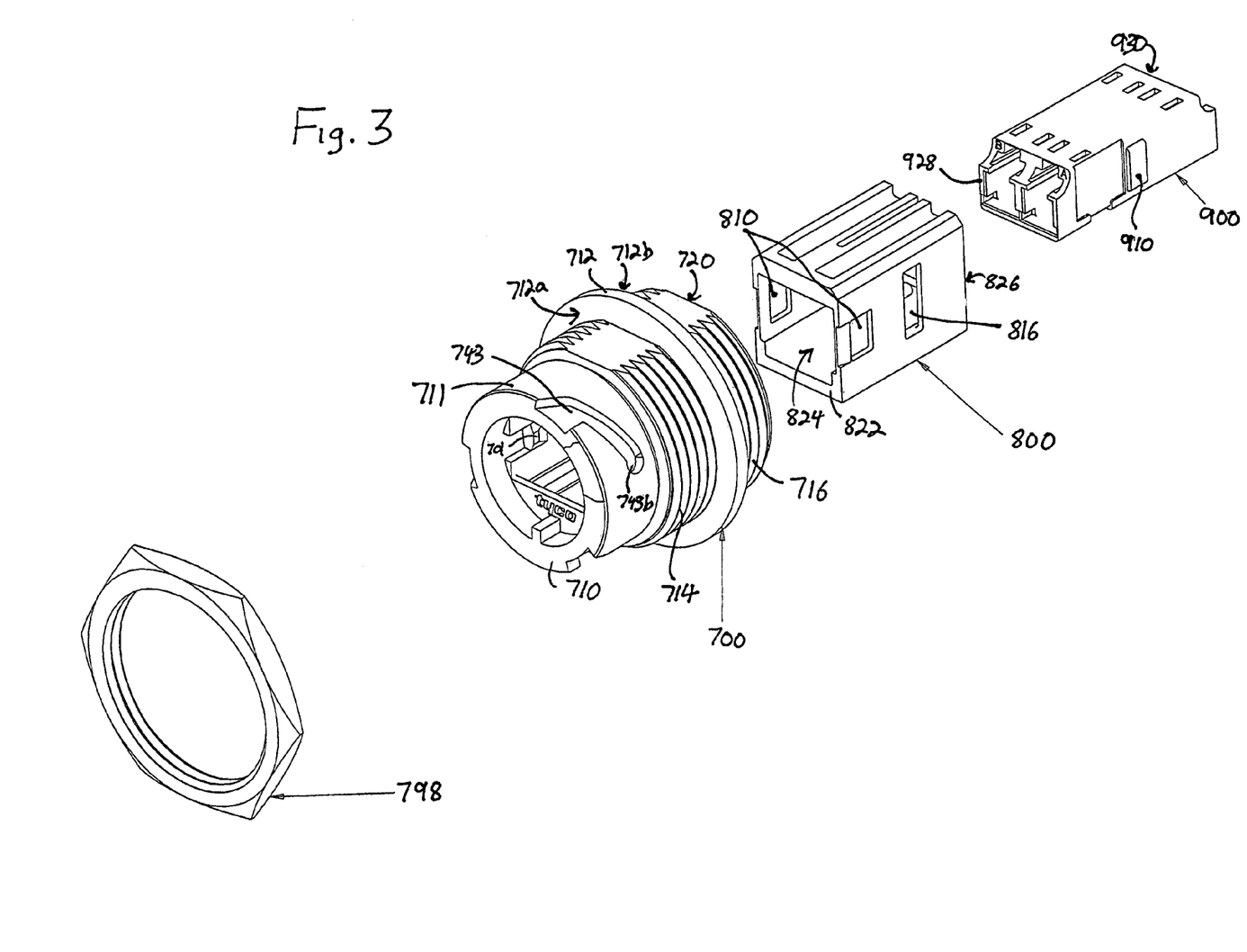
FIG. 3 is an axially exploded perspective view of the components of the adapter half of the protective enclosure of FIG. 1 in accordance of the principles of the present invention.

Referring again to FIG. 2, the shell 300 and compression fitting 100 may be of any conventional design. As illustrated, the shell is generally cylindrical and comprises knurls 310 on its outer surface to assist with gripping it and rotating it by hand. It includes a coupling mechanism that will mate with a complementary coupling mechanism on the adapter housing for sealing the connector therein protected against dust, moisture and other contaminants. In one exemplary embodiment, the two parts couple with complementary bayonet style mechanisms. In such an embodiment, one or more bayonet lock buttons 312 are formed on the inner cylindrical surface 315 of the shell 300 for mating with the corresponding grooves on the outer surface of the adapter housing 700 of the other half 3 of the protective enclosure 1 (as seen in FIG. 3 to be discussed in more detail below). Alternate coupling mechanisms are possible, including mating internal and external threads, interference fits, snap ring fits, etc.

The front end of the shell 300 is open and the rear end includes a wall (obstructed from view in the perspective view of FIG. 2) having a circular opening for accepting the rear portion 410 of the universal holder 400 there through. The circular opening is sized to be large enough to permit the rear portion 410 there through, but small enough to prevent the intermediate flange 412 of the universal holder 400 from passing there through. The rear end 410 of the universal holder 400 is internally threaded.

The compression fitting 100 comprises an externally threaded front end 115 for fitting within and matingly engaging the internally threaded rear portion 410 of the universal holder. It also has a rear portion 111 for engaging a strain relief cap in any reasonable manner. For instance, the rear portion 111 may be threaded and/or tapered. Intermediate the front and rear portions 115, 111 is a flange 113. The flange has a diameter greater than the diameter of the circular hole in the rear wall of the shell 300 so that the shell 300 cannot be moved beyond it.

When assembled the compression fitting 100 is screwed into the universal holder 400. Thus, the shell 300 is loosely trapped between the flange 412 of the universal holder 400 and the flange 113 of the compression fitting 100.

Typically, the compression fitting 100, shell 300, universal holder 400, and interfacial seal 200 will be delivered to an installer pre-assembled. The installer will simply need to run the optical fiber cable(s) through the assembly, properly terminate the cable(s) to the connector(s) 600, assemble the connectors to the duplex clip 500 (as previously described in connection with FIGS. 10A and 10B), and slide the connector(s)/duplex clip assembly 1000 into the holder 400 to fully assemble the plug half 2 of the protective enclosure 1. When sliding the assembly 1000 into the universal holder 400, the installer should squeeze the latches 645, 647 of the plug 600 into the downwardly flexed position to permit easy entry into the universal holder 400. Once inserted, the latches will be maintained in the downwardly flexed position by the walls of the bore 416 of the universal holder 400.

Turning now to the adapter half 3 of the protective enclosure 1 shown in more detail in FIG. 3, the adapter assembly includes a duplex LC adapter 900, an adapter sleeve 800, and an adapter housing 700. The duplex LC adapter 900, adapter sleeve 800, and adapter housing 700 typically would be formed of a polymeric material. The polymeric adapter housing 700, sleeve 800, and LC adapter 900 may be electroplated, vacuum metalized, or may include fillers, such as graphite fiber, to provide suppression from EMI emissions.

The outer surface of the housing 700 is generally cylindrical with the rear portion thereof 720 bearing external threads 716, the threads intersected by a flange 712. The threads permit the adapter housing to be mounted to a bulkhead or panel with a suitably sized and shaped opening by pressing the front or rear edge of 712a or 712b of the flange 712 against the panel or bulkhead and screwing a nut 798 over the front or rear threads to press the panel or bulkhead between the respective edge of the flange 712 and the surface of the nut 798. The threads 716 on both sides of the flange 712 permits the adapter housing 700 to be mounted with either the front edge 712a or the rear edge 712b against the panel or bulkhead.

The front portion 711 of the adapter housing is not threaded, but instead bears at least one bayonet coupling groove 743 open to the front surface 710 of the housing and terminating at the opposite end of the groove in a button recess 743b. The bayonet groove 743 accepts the bayonet button 312 on the shell 300 of the plug half 2 of the protective enclosure. The adapter housing 700 includes an internal bore 718 that has a generally rectangular rear opening (not seen) and a generally circular front opening. The adapter housing 700 also is a multi-purpose housing that can be used as a protective enclosure for RJ-45 connectors and which can be adapted, in accordance with the principles of the present invention, to work with LC adapter connectors also.

Figure 8:
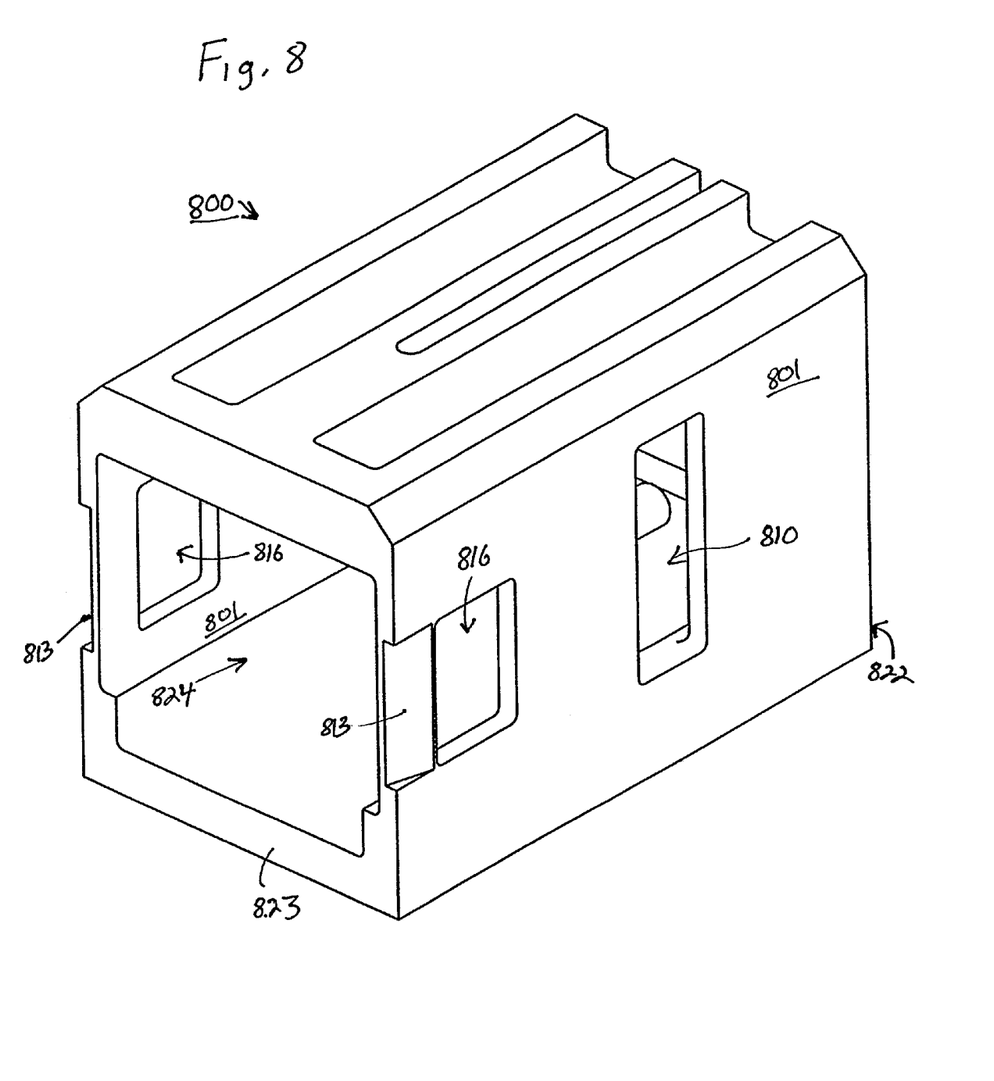
FIG. 8 is a more detailed perspective view of the adapter sleeve of FIG. 3.

Referring now to FIG. 8, the adapter sleeve 800 is designed to mate an LC duplex adapter 900 to the adapter housing 700. The adapter sleeve 800 is essentially rectangular, being sized and shaped to be slightly smaller than the rectangular opening in the rear of the adapter housing 700 so that it can be slid snugly into the housing 700. It has a generally rectangular, uniform internal bore 824 running all the way through from the rear face 822 to the front face 823 of the sleeve 800. The internal bore 824 is slightly larger than the outer dimensions of a standard LC duplex adapter housing so that such an LC duplex adapter will slide snugly into the adapter sleeve 800. The sleeve has a rear side slot 810 in each side wall and a forward side slot 816 in each side wall. The forward side slots 816 have a beveled lead in 813 extending from the front surface 823 of the sleeve 800 to the front edge of the slot.

Figure 9:
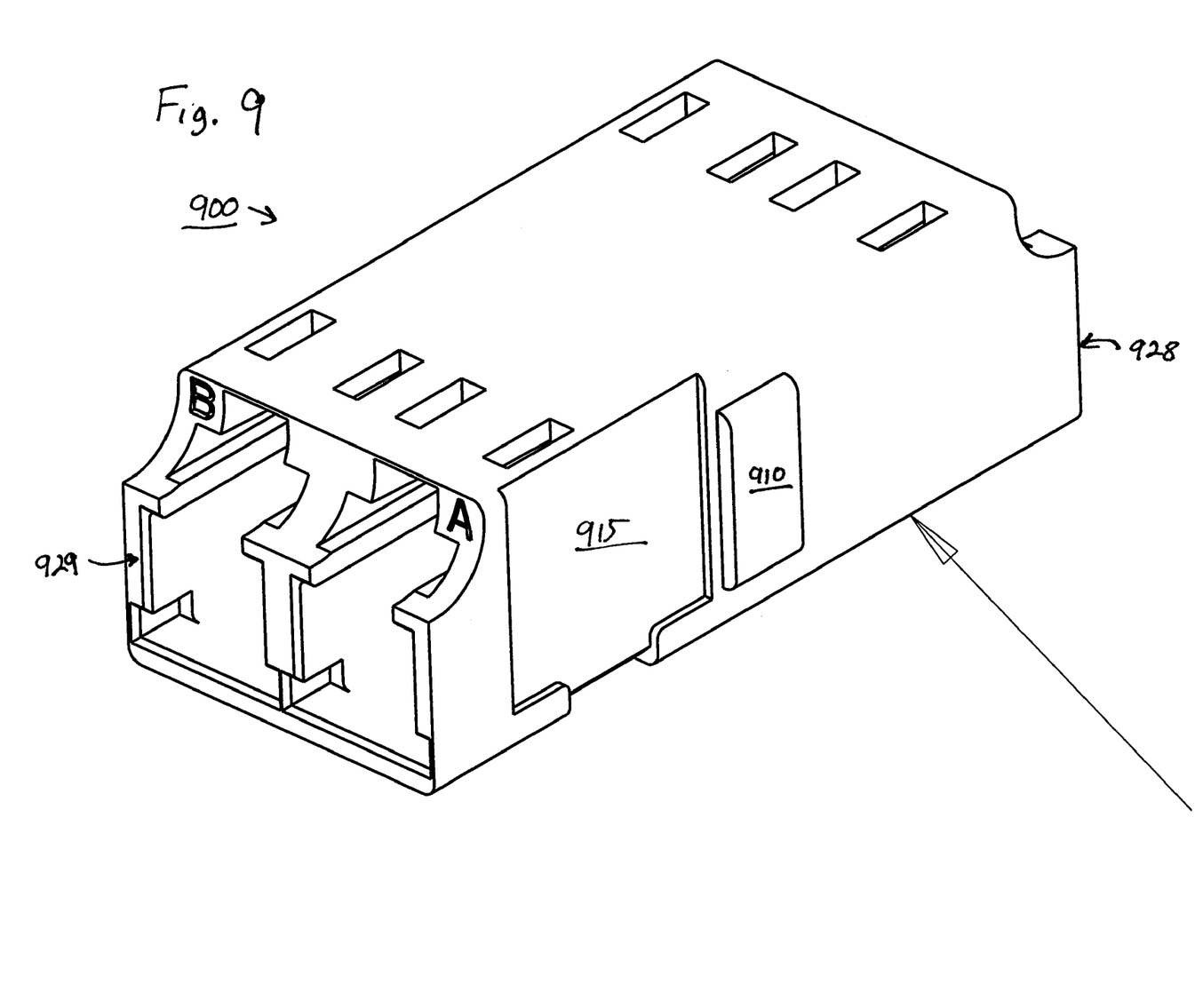
FIG. 9 is a more detailed perspective view of the LC adapter of FIG. 3.

The two rear slots 810 are designed to snugly mate with protrusions 910 (FIG. 9) extending from the sides of the LC adapter 900. The dimensions of the inner bore 824 of the sleeve 800 are dimensioned to be slightly larger than the outer dimensions of a standard LC adapter, excluding the protrusions 910. The side walls 801 of the adapter sleeve 800 will flex outwardly to permit the protrusions 910 on the LC adapter to enter the internal bore 824 of the sleeve 800. When the protrusions 910 reach the slots 810, the walls 801 will snap back inwardly, thereby trapping the protrusions 910 in the slots 810 and fixing the LC adapter 900 in the sleeve 800.

The sleeve 800 with the LC adapter 900 mounted therein as just described is then inserted axially into the adapter housing 700 from the rear (i.e., in the forward direction). The housing 700 includes two internal catches 701 (one of them can be seen in FIG. 3) designed for mating with the slots found on standard RJ-45 adapters. As the sleeve 800 is advanced, these catches ride up over the beveled lead ins 813 causing the sleeve to flex inwardly until the catches 701 reach the slots 816, thereby permitting the wall of the sleeve to snap back outwardly and trap the catches 701 in the slots 810, thereby locking the sleeve 800 (bearing the LC adapter 900) within the housing 700. The outer dimensions of the sleeve are selected so that the sleeve fits snugly within the rectangular bore in the rear of the adapter housing 700.

To join the adapter half 3 to the plug half 2 of the connector and seal the connection against dust, moisture and other contaminants, the two halves 2, 3, are joined in standard bayonet connection fashion. Specifically, the front ends of the two halves 2, 3 are brought together and twisted so that the bayonet button(s) 312 on the plug sleeve 312 can enter the bayonet groove(s) 743 in the adapter housing and the two halves 2, 3 are rotated relative to each other about a quarter turn so that the button 312 rides along the groove 743. As the button 312 slides in the groove 743, it draws the two halves 2, 3 axially toward each other until the button reaches the button indent 743b. The groove 743 and button 312 are relatively positioned on their respective elements 700 and 300 such that, when the button reaches the indent, the front surface 710 of the adapter housing 700 will squeeze the interfacial seal 200 against the front edge of flange 412 of universal holder 400 enough to form a tight seal, but not compromise the integrity of the interfacial seal 200. Also, when the button reaches the indent 743b, the pressure against the resilient seal 200 will cause the button to enter the indent, thereby providing some resistance to rotation of the two halves in the reverse direction, whereby the two halves might become inadvertently uncoupled.

While the invention has been described in connection with a duplex connection, it should be apparent that the invention can also be employed in connection with a simplex connector, for instance, by simply providing only one plug connector 600 in the assembly 1000.

The present invention provides a protective enclosure that can readily be adapted for use with RJ-45 type copper connectors as well as LC type optical fiber connectors. Particularly, we have taken an adapter housing and a mounting member particularly dimensioned for accepting RJ-45 connectors and adapted them for use with LC connectors by the addition of one clip used in the plug portion of the connector and one adapter sleeve used in the adapter portion of the connector.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A protective enclosure adaptable for use with different types of connectors, including LC type fiber optic connectors, comprising:
   a plug portion having at least;
      a plug housing having an internal longitudinal bore between a forward end and a rearward end of said housing and adapted to accept a plug connector of a connector type larger than an LC adapter;
      a shell bearing a first coupling mechanism;
      a clip to which at least one LC plug connector can be fixedly mounted, said clip adapted to fixedly clip into said bore of said plug housing; and
   an adapter portion having at least:
      an adapter housing having an internal longitudinal bore between a forward end and a rearward end of said housing adapted to accept an adapter connector of a connector type larger than an LC adapter and a second coupling mechanism for complementary mating with said first coupling mechanism of said plug portion, whereby a pair of complementary connectors within said protective enclosure can be sealed therein; and
      a sleeve adapted to fixedly snap into the internal bore of said adapter housing and having an internal bore adapted to fixedly accept an LC adapter connector.

2. The protective enclosure of claim 1 wherein said internal longitudinal bore of said plug housing is adapted to accept an RJ-45 plug connector and wherein said clip comprises:
   a saddle assembly including first and second saddles, each saddle dimensioned to accept therein an LC plug connector; and
   first and second arms cantilevered from said saddle assembly, said first and second arms bearing, respectively, first and second latches at distal ends thereof.

3. The protective enclosure of claim 2 wherein said internal bore of said plug housing includes an intermediate wall, said wall defining a shoulder, and wherein said arms and latches of said clip are dimensioned to engage said shoulder in order to block said clip from being removed in a first direction from said bore.

4. The protective enclosure of claim 3 wherein said plug housing has a forward open end and a rearward open end and wherein said internal bore of said plug housing extends in a longitudinal direction from said forward open end to said rearward open end, and wherein said bore further includes two opposed, blind channels running in the longitudinal direction and in communication with said forward open end, said channels having a length in said longitudinal direction and a width transverse said longitudinal direction, each said channel including a rearward edge intermediate said forward end and said intermediate wall, and said clip further comprising two opposed ribs on said saddle assembly running in the longitudinal direction having a width transverse said longitudinal direction approximately equal to said width of said channels of said plug housing so as to fit snugly within said channel, each said rib having a rearward end in said longitudinal direction, wherein said rearward ends are spaced from said latches in said longitudinal direction a distance approximately equal to a distance between said shoulder of said intermediate wall and said rear edges of said channels of said internal bore of said plug housing.

5. The protective enclosure of claim 3 wherein internal bore of said plug housing comprises forward and rearward portions having different dimensions, and said arms of said clip are formed of a resilient material and wherein said arms are spaced apart from each other such that, upon insertion of said clip into said plug housing from said forward opening in said longitudinal direction, said latches will engage said internal wall of said forward portion of said internal bore of said plug housing causing said arms to flex inwardly to permit said latches to slide into said bore and, upon said latches passing said intermediate wall, said arms snapping back to outwardly such that said latches catch on said shoulder of said intermediate wall.

6. The protective enclosure of claim 4 wherein said saddles comprise an intermediate wall extending transversely to said longitudinal direction, first and second outer walls extending parallel to said intermediate wall, first and second bottom walls joining said first and second outer walls to said intermediate wall, respectively, and first and second flanges extending from said outer walls, respectively, opposite said bottom walls, whereby said intermediate wall, said first outer wall, said first bottom wall, and said first flange define said first saddle and said intermediate wall, said second outer wall, said second bottom wall, and said second flange define said second saddle.

7. The protective enclosure of claim 1 wherein said first coupling mechanism comprises at least one bayonet button disposed on an inner surface of said shell and said second coupling mechanism comprises at least one groove for accepting said button.

8. The protective enclosure of claim 7 wherein said plug housing further comprises a radial flange extending radially outwardly from said housing intermediate said forward and rearward ends and wherein said enclosure further comprises an interfacial seal dimensioned to be compressed between said radial flange and said forward end of said adapter housing when said first and second coupling mechanisms are joined.

9. The protective enclosure of claim 1 wherein said sleeve comprises a forward end and a rearward end and a wall extending between said forward end and said rearward end, said wall including first and second opposed slots, each adapted to accept a protrusion of an LC connector when inserted longitudinally in said bore of said sleeve such that said LC connector becomes fixed within said bore.

10. The protective enclosure of claim 9 wherein said adapter housing includes first and second catches disposed in said internal bore and adapted to engage a latches of an RJ-45 type adapter and wherein said sleeve further comprises third and fourth opposed slots adapted to accept said first and second catches in said internal bore of said adapter housing when said sleeve is inserted longitudinally in said bore such that said sleeve becomes fixed within said bore.

11. A protective enclosure for an LC type fiber optic connector comprising:
a plug portion comprising at least;
a plug housing having a forward end and a rearward end and an internal longitudinal bore between said forward and rearward ends, said bore adapted to fixedly accept an RJ-45 plug connector therein, and comprising an internal wall intermediate said forward and rearward ends, said internal wall defining a shoulder for engaging a latch of an RJ-45 plug connector, said plug housing further comprising at least one blind channel in a wall of said bore, said blind channel having a rearward edge;
a clip comprising a saddle assembly having first and second saddles, each saddle dimensioned to fixedly accept an LC plug connector therein, said saddle assembly having outer dimensions so as to fit snugly within said bore of said plug housing, said clip further comprising first and second cantilevered arms extending rearwardly from said saddles, each arm having a proximal end adjacent said saddle assembly and a distal end and bearing a latch at said distal end, said arms and latches dimensioned so that said latches will engage said shoulder of said intermediate wall so as to prevent said clip from being removed forwardly from said plug housing, said clip further comprising at least one rib dimensioned and positioned on said clip to snugly engage said at least one channel of said plug housing when said clip is inserted in said plug housing so as to prevent further rearward travel of said clip into said plug housing when said latches engage said shoulder of said intermediate wall of said plug housing;
a shell bearing a first coupling mechanism; and
an adapter portion comprising at least:
an adapter housing having a forward end and a rearward end and including an internal longitudinal bore between said forward and rearward ends, said bore adapted to fixedly accept an RJ-45 adapter connector therein and including catches disposed in said bore adapted to mate with slots on an RJ-45 adapter connector, and a second coupling mechanism for complementary mating with said first coupling mechanism of said plug portion, whereby a pair of complementary connectors within said protective enclosure can be sealed therein;
a sleeve having a forward end and a rearward end and a wall extending between said forward and rearward ends, and including an internal longitudinal bore between said forward and rearward ends, an outer surface of said wall dimensioned to fit snugly within said bore of said adapter housing, and said bore of said sleeve dimensioned to snugly accept an LC adapter connector therein.

12. The protective enclosure of claim 11 wherein said bore further includes two opposed, blind channels running in the longitudinal direction and in communication with said forward open end, said channels having a length in said longitudinal direction and a width transverse said longitudinal direction, each said channel including a rearward edge intermediate said forward end and said intermediate wall, and said clip further comprising two opposed ribs on said saddle assembly running in the longitudinal direction having a width transverse said longitudinal direction approximately equal to said width of said channels of said plug housing so as to fit snugly within said channel, each said rib having a rearward end in said longitudinal direction, wherein said rearward ends are spaced from said latches in said longitudinal direction a distance equal to a distance between said shoulder of said intermediate wall and said rear edges of said channels of said internal bore of said plug housing.

13. The protective enclosure of claim 12 wherein said saddles comprise an intermediate wall extending transversely to said longitudinal direction, first and second outer walls extending parallel to said intermediate wall, first and second bottom walls joining said first and second outer walls to said intermediate wall, respectively, and first and second flanges extending from said outer walls, respectively, opposite said bottom walls, whereby said intermediate wall, said first outer wall, said first bottom wall, and said first flange define said first saddle and said intermediate wall, said second outer wall, said second bottom wall, and said second flange define said second saddle.

14. The protective enclosure of claim 13 wherein said first coupling mechanism comprises at least one bayonet button disposed on an inner surface of said shell and said second coupling mechanism comprises at least one groove for accepting said button.

15. The protective enclosure of claim 14 wherein said plug housing further comprises a radial flange extending radially outwardly from said housing intermediate said forward and rearward ends and wherein said enclosure further comprises an interfacial seal dimensioned to be squeezed between said radial flange and said forward end of said adapter housing when said first and second coupling mechanisms are joined.

16. The protective enclosure of claim 15 wherein said wall of said sleeve includes first and second opposed slots, each adapted to accept a protrusion of an LC connector when inserted longitudinally in said bore of said sleeve such that said LC connector becomes fixed within said bore.

17. The protective enclosure of claim 16 wherein said adapter housing includes first and second catches disposed in said internal bore and adapted to engage latches of an RJ-45 type adapter and wherein said sleeve further comprises third and fourth opposed slots adapted to accept said first and second catches in said internal bore of said adapter housing when said sleeve is inserted longitudinally in said bore such that said sleeve becomes fixed within said bore.

* * * * *